(12) United States Patent
Schneider et al.

(10) Patent No.: US 11,383,669 B2
(45) Date of Patent: Jul. 12, 2022

(54) AIRBAG CUSHIONS WITH PASS-THROUGH CHAMBERS AND RELATED SYSTEMS

(71) Applicant: Autoliv ASP, Inc., Ogden, UT (US)

(72) Inventors: David W. Schneider, Waterford, MI (US); Frank Joseph Herzenstiel, II, Davisburg, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/066,419

(22) Filed: Oct. 8, 2020

(65) Prior Publication Data
US 2022/0111815 A1   Apr. 14, 2022

(51) Int. Cl.
*B60R 21/214* (2011.01)
*B60R 21/233* (2006.01)
*B60R 21/2338* (2011.01)
*B60R 21/00* (2006.01)

(52) U.S. Cl.
CPC .......... *B60R 21/214* (2013.01); *B60R 21/233* (2013.01); *B60R 21/2338* (2013.01); *B60R 2021/0048* (2013.01)

(58) Field of Classification Search
CPC ... B60R 21/214; B60R 21/232; B60R 21/233; B60R 21/2338; B60R 2021/0009; B60R 2021/0023; B60R 2021/0048; B60R 2021/23308; B60R 2021/23316; B60R 2021/23382; B60R 2021/23386
See application file for complete search history.

(56) References Cited

U.S. PATENT DOCUMENTS

| | | | |
|---|---|---|---|
| 6,283,500 B1 * | 9/2001 | Eckert | B60R 21/231 280/729 |
| 6,722,691 B1 | 4/2004 | Haland et al. | |
| 7,055,852 B2 * | 6/2006 | Bakhsh | B60R 21/232 280/730.1 |
| 7,926,840 B1 * | 4/2011 | Choi | B60R 21/214 280/730.1 |
| 8,393,637 B2 * | 3/2013 | Choi | B60R 21/231 280/730.1 |
| 8,414,017 B2 * | 4/2013 | Lee | B60R 21/231 280/730.1 |
| 8,505,966 B2 * | 8/2013 | Yoo | B60R 21/239 280/730.1 |
| 8,579,321 B2 * | 11/2013 | Lee | B60R 21/233 280/729 |

(Continued)

*Primary Examiner* — Laura Freedman
(74) *Attorney, Agent, or Firm* — Matthew D. Thayne; Thayne and Davis LLC

(57) ABSTRACT

Airbag assemblies, such as overhead airbag assemblies, comprising overlapping pass-through chambers. In some embodiments, the assembly may comprise an airbag cushion configured to deploy from a vehicle roof structure and a head contact chamber configured to engage a head of an occupant of the vehicle upon deployment. An opening may be formed within the airbag cushion adjacent to the head contact chamber and may extend from a first surface of the airbag cushion configured to engage the occupant to a second surface of the airbag cushion opposite the first surface. The opening may be smaller along one or more dimensions than the head contact chamber upon deployment such that the head contact chamber cannot enter the opening without engaging one or more portions of the airbag cushion defining the opening.

20 Claims, 8 Drawing Sheets

(56) References Cited

U.S. PATENT DOCUMENTS

| | | | | |
|---|---|---|---|---|
| 8,807,593 B2* | 8/2014 | Lee | ............... | B60R 21/213 |
| | | | | 280/730.1 |
| 9,771,049 B2* | 9/2017 | Lee | ............... | B60R 21/232 |
| 10,266,145 B2 | 4/2019 | Paxton et al. | | |
| 10,486,637 B2* | 11/2019 | Thomas | ............... | B60R 21/215 |
| 10,583,799 B2* | 3/2020 | Schneider | ............ | B60R 21/214 |
| 10,836,343 B2* | 11/2020 | Nakajima | ............ | B60R 21/205 |
| 10,960,844 B2* | 3/2021 | Jimenez | ............... | B60R 21/214 |

* cited by examiner

AIRBAG CUSHIONS WITH PASS-THROUGH CHAMBERS AND RELATED SYSTEMS

SUMMARY

Airbag cushions, such as overhead curtain airbag cushions, for example, may provide insufficient or otherwise inadequate (such as undesirably late) restraint, particularly to the head region of an adjacent vehicle occupant.

The present inventors have therefore determined that it would be desirable to provide apparatus, systems and methods that overcome one or more of the foregoing limitations and/or other limitations of the prior art. In some embodiments, the inventive concepts disclosed herein may therefore provide an airbag system, such as a frontal airbag system, that includes a head restraint chamber that may be configured to frictionally engage an adjacent opening formed in a main body of the cushion during deployment.

In a more particular example of an overhead airbag assembly according to some embodiments, the assembly may comprise an airbag cushion configured to deploy from a vehicle roof structure and a head contact chamber configured to engage a head of an occupant of the vehicle upon deployment. The head contact chamber may be fluidly coupled with the airbag cushion. An opening may be formed within the airbag cushion adjacent to the head contact chamber and may extend from a first surface of the airbag cushion configured to engage the occupant to a second surface of the airbag cushion opposite the first surface. Preferably, the opening is smaller along at least one dimension than the head contact chamber upon deployment such that the head contact chamber cannot enter the opening without engaging one or more portions of the airbag cushion defining the opening.

In some embodiments, the opening may be defined by one or more slots extending through the airbag cushion. In some such embodiments, the opening may be defined by a first slot and a second slot, wherein the first slot is spaced apart from the second slot.

Some embodiments may further comprise an overlapping chamber configured to deploy distal of the head contact chamber relative to the occupant, wherein the first slot is at least substantially parallel to the second slot, and wherein the head contact chamber is configured to engage and articulate the overlapping chamber within the opening during deployment.

In some embodiments, one or more of the slots may define a fixed end of the head contact chamber from which the head contact chamber extends from the airbag cushions, such as from a primary chamber of the airbag cushion.

Some embodiments may further comprise one or more restraining members, such as panels and/or tethers. In some such embodiments, these restraining members may comprise external restraining members and may be coupled to the second surface of the airbag cushion. In some embodiments, the restraining member(s) may be configured to engage the head contact chamber during deployment to limit the amount of excursion of the head of the occupant following contact with the head contact chamber. In some such embodiments, the restraining member may comprise one or more weakened portion, such as a tear seam/stitch, or the like, that may be configured to sever during deployment.

In an example of an airbag cushion according to some embodiments, the airbag cushion may comprise a primary chamber comprising a slot extending from a first surface of the airbag cushion, the first surface configured to engage a vehicle occupant, to a second surface of the airbag cushion opposite from the first surface. The airbag cushion may further comprise a secondary chamber configured to deploy adjacent to the first surface between the vehicle occupant and the primary chamber. The secondary chamber may be configured to frictionally engage at least a portion of the airbag cushion defining the slot during deployment.

In some embodiments, the airbag cushion may comprise an overhead airbag cushion, such as an airbag cushion configured to deploy from a vehicle roof structure.

In some embodiments, the secondary chamber may comprise a head contact chamber configured to frictionally engage the at least a portion of the airbag cushion after engaging a head of the vehicle occupant.

Some embodiments may further comprise a pair of side lobes configured to deploy from opposite sides of the head contact chamber. Such side lobes may be configured to engage opposite sides of a vehicle occupant's head to provide added protection, particularly during oblique impact events.

Some embodiments may further comprise one or more external restraining members coupled to the second surface, which may be configured to limit the excursion of the head of the vehicle occupant during deployment. The external restraining member(s) may be configured to directly engage the head contact chamber during deployment or may be configured to engage another feature of the cushion, such as a secondary inflation chamber.

In another example of an overhead airbag assembly according to some embodiments, the assembly may comprise an airbag cushion comprising a primary chamber. The primary chamber may comprise an opening extending therethrough. In some embodiments, the opening may be positioned at an at least substantially central position between opposing lateral sides of the primary chamber upon deployment. The assembly may further comprise a head chamber configured to deploy proximal of the primary chamber relative to a vehicle occupant adjacent to the opening, wherein the head chamber is configured to engage a head of the vehicle occupant during deployment. The head chamber may be configured to at least partially pass through the opening during deployment after contacting the head of the vehicle occupant. The head chamber may further be configured to frictionally engage at least a portion of the airbag cushion defining the opening while at least partially passing through the opening.

In some embodiments, the opening may comprise a shape that is identical, or at least substantially identical, to the head chamber but smaller in profile than the head chamber to facilitate the aforementioned frictional engagement.

In some embodiments, the airbag cushion may further comprise a secondary head chamber, which may be positioned distal of the head chamber relative to the vehicle occupant during deployment. In some embodiments, the secondary head chamber may be configured to overlap with and engage the head chamber during deployment.

In some embodiments, the head chamber may extend from the primary chamber at a fixed end. In some such embodiments, the secondary head chamber may similarly extend from the primary chamber at a fixed end. In some embodiments, the fixed end of the head chamber may be positioned opposite from the fixed end of the secondary head chamber relative to the opening.

In some embodiments, the airbag cushion may further comprise a head chamber panel coupled to a distal side of the airbag cushion. The head chamber panel may be configured to engage the head chamber during deployment to at least one of (1) limit the amount of articulation of the head chamber; and (2) absorb energy from the head chamber.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
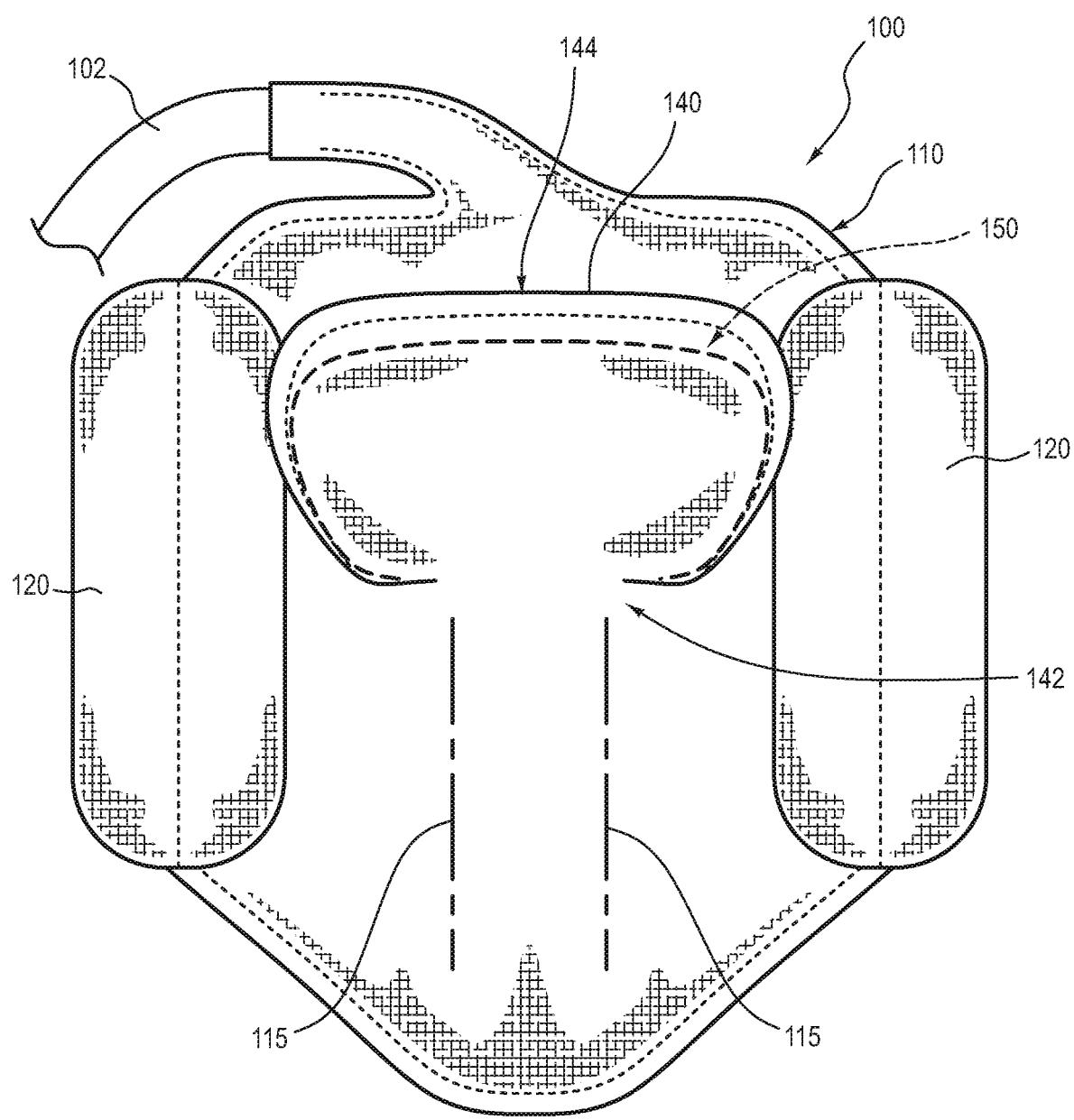
FIG. 1 is a front elevation view of an airbag cushion having a head chamber overlapping with a pass-through opening according to some embodiments.

FIG. 1 depicts an airbag assembly 100 according to some embodiments. Airbag assembly 100 may, in certain preferred embodiments, comprise a frontal curtain or other frontal restraint airbag cushion. However, it is contemplated that one or more of the principles, features, and/or embodiments disclosed herein may be incorporated into other airbag cushions and related systems/assemblies.

Airbag assembly 100 comprises an inflator 102 configured to inflate an airbag cushion 110, which may in some embodiments be configured to deploy from a vehicle roof structure, such as a header of the vehicle or the like. Cushion 110 comprises a pair of side or other supplemental lobes 120 configured to deploy from opposite sides of the cushion 110. Side lobes 120 may be configured to receive the head of a vehicle occupant during certain impact events, such as oblique collisions, in order to prevent or at least limit the rotation and/or lateral excursion of the head during oblique impact events to prevent or at least reduce injury to the head and/or neck regions of the vehicle occupant.

One or more interfaces between the proximal and distal surfaces of the cushion 110 may be provided, such as internal tethers 115. Such tethers 115 or other suitable interface elements may be used to control desired inflation characteristics, such as limiting expansion of one or more portions of the cushion 110.

A supplemental chamber, such as an inflatable head chamber 140, may be configured so as to inflate on the occupant-facing side (the side visible in FIG. 1) of the assembly 100. Head chamber 140 is preferably fluidly coupled with one or more (in some cases, all) of the other inflatable elements of assembly 100. In the depicted embodiment, head chamber 140 comprises a fixed end 142 and a free end 144. Fixed end 142 may be attached to the main body of cushion 110 to allow free end 144 to articulate (pivot and/or rotate) with respect to the adjacent portion or portions of the assembly 100.

An opening 150 is formed within the airbag cushion 110 adjacent to the head contact chamber. Preferably, opening 150 extends all the way between opposite sides of the cushion 110. Thus, in the depicted embodiment, opening 150 extends from a first or occupant impact surface of the airbag cushion 110 to a second surface of the airbag cushion 110 opposite the first surface, which may in the case of a frontal curtain cushion be configured to face a steering wheel and/or instrument panel of the vehicle.

In the depicted embodiment, opening 150 does not comprise a complete, contiguous perimeter. In other words, opening 150 is defined by a single slit or slot that extends in an incomplete perimeter. As those of ordinary skill in the art will appreciate, this may leave one or more flaps of material, which may be removed if desired to allow for opening 150 to be similar in shape and/or size to the adjacent head chamber 140. As will be apparent in connection with the discussion of other embodiments below, one or more slits, slots, cuts, and/or the like may be formed to facilitate formation of a suitable pass-through opening or may form the opening alone themselves. In the depicted embodiment, this slit/slot extends away from opposing ends of fixed side 142 to form the perimeter of the opening 150 but does not extend directly between these opposing ends. Other examples of suitable openings are contemplated, however, such as two or more separate, discontinuous slits, as discussed later in connection with other figures. It is also contemplated that other suitable openings may alternatively be defined by forming a complete hole or opening through the cushion.

As shown in FIG. 1, preferably the size of opening 150 is smaller along at least one dimension than the head chamber 140 upon deployment. This feature, among others, distinguishes some of the embodiments described herein from the airbag assemblies disclosed in U.S. Pat. No. 10,266,145 titled "FRONTAL AIRBAG ASSEMBLIES," the entire disclosure of which is incorporated herein by reference. This feature also provides several benefits, such as allowing for increased area and/or depth for the head contact area of the cushion. In addition, by providing a larger head chamber 140 than the adjacent opening 150, an overlap condition is created that provides friction and increased resistance to further restrain the occupant's head and correspondingly absorb energy during impact.

Thus, in certain preferred embodiments, including the embodiment depicted in FIG. 1, the head chamber 140 and adjacent pass-through opening 150 may be configured such that the head chamber 140 cannot enter and/or pass through the pass-through opening 150 without engaging one or more portions of the airbag cushion defining the opening 150. This may also allow the head chamber 140 to initially be inflated closer to the occupant, which may also be beneficial to improve early head restraint. In some embodiments, opening 150 may comprise a profile and/or shape that is at least substantially identical to but smaller than a corresponding profile and/or shape of the head chamber 140. Thus, the head chamber 140 may be larger than the adjacent opening 150 along the entire perimeter of head chamber 140 and/or opening 150, as shown in FIG. 1, which may provide a more even distribution of the increased friction and restraint provided by the overlap condition between the two elements of assembly 100.

Figure 2:
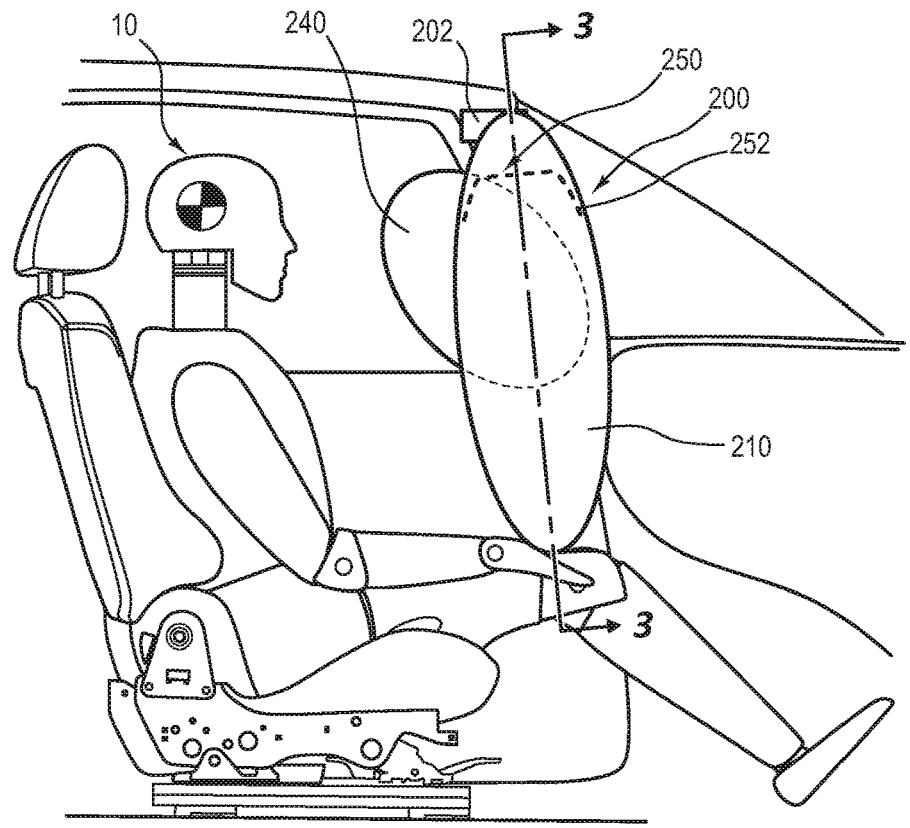
FIG. 2 is a side elevation view of a vehicle having an airbag system including a head chamber and an overlapping pass-through opening shown following deployment.

FIG. 2 depicts an airbag assembly 200 in a vehicle during deployment. Again, assembly/system 200 may comprise an inflator 202, a main body or chamber 210, and a head chamber 240 that is larger than an adjacent opening 250 so as to create an overlap/frictional engagement condition. As shown in this figure, head chamber 240 initially projects towards occupant 10 relative to the adjacent main body of cushion 210. Upon contacting the head of occupant 10, head chamber 240 may then articulate from the force of this engagement and at least partially enter opening 250. In some embodiments, head chamber 240 may at least partially pass entirely through opening 250. Again, because the profile of head chamber 240 is less than that of opening 250, the portions of the assembly 200 defining the opening 250 frictionally engage the head chamber 240 and provide increased restraint and energy absorption.

As also shown in FIG. 2, in some embodiments, one or more portions of the opening 250 may be tapered such that increased resistance is needed in order to initially enter, and subsequently exit, opening 250. These tapered regions 252 are shown at opposing ends of opening 250. However, as those of ordinary skill in the art will appreciate, tapered regions 252 may only be formed along one side/end of opening 250, or not at all, in alternative embodiments. Similarly, although tapered regions 252 are shown tapering in opposite directions in FIG. 2, it is contemplated that, in other embodiments, a taper may be formed in a single direction all the way through the opening 250. For example, rather than tapering from narrow to wide and then back to narrow, as shown in FIG. 2, it is contemplated that it may be beneficial to taper from narrow to wide all the way, or in a stepped fashion, from the proximal to the distal side of opening 250, for certain applications/embodiments.

Figure 3:
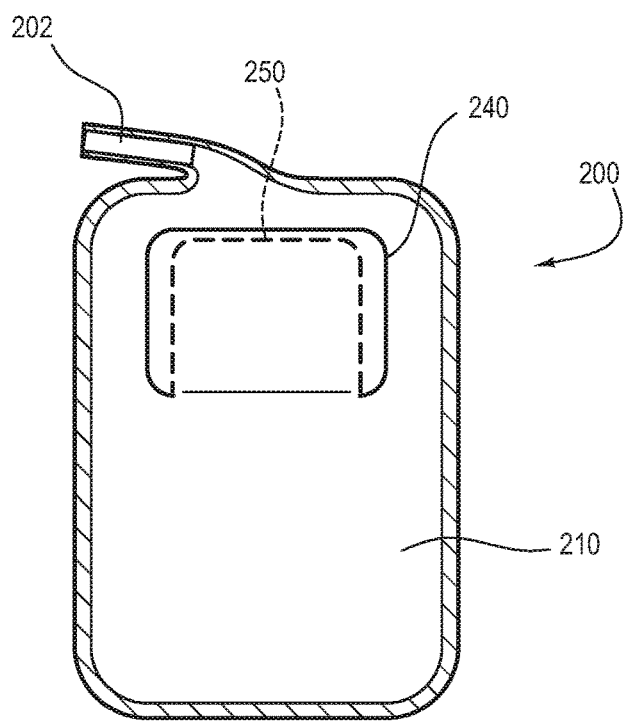
FIG. 3 is a cross-sectional view taken along line 3-3 in FIG. 2.

The cross-sectional image of FIG. 3 illustrates that both the head chamber 240 and the adjacent opening 250 may comprise three sides that are parallel, or at least substantially parallel. Preferably, each of these three sides of head chamber 240 is larger than the adjacent side of the opening 250, as also shown in FIG. 3. However, it is contemplated that head chamber 240 may only be larger than opening 250 in one location and/or in one dimension, if desired.

Figure 4A:
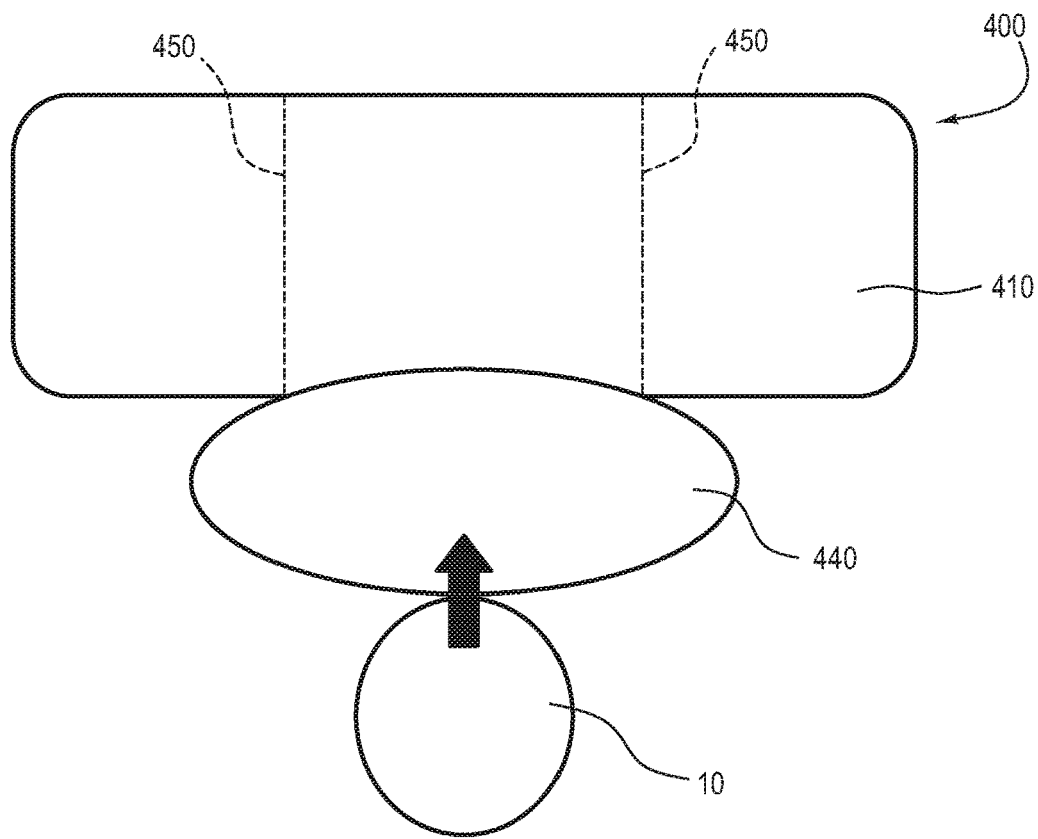
FIG. 4A is a top elevation view of an airbag system having a head chamber overlapping with a pass-through opening according to other embodiments shown during an initial stage of deployment.
Figure 4B:
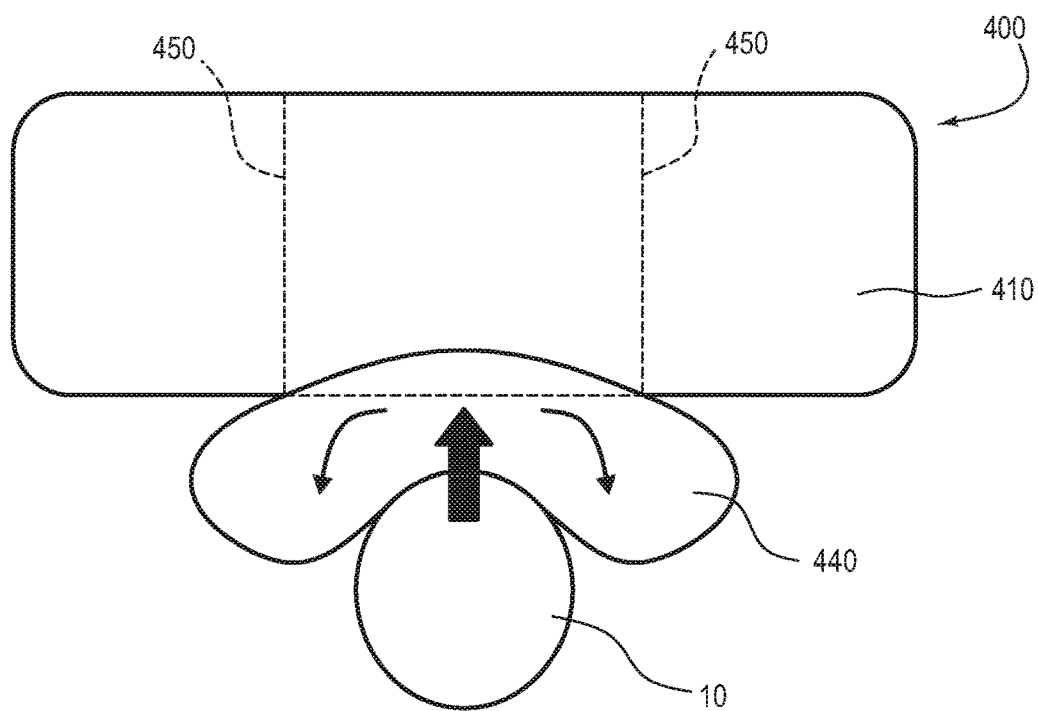
FIG. 4B is a top elevation view of the airbag system of FIG. 4A shown following engagement between an occupant's head and the head chamber of the system.

FIGS. 4A and 4B depict overhead views of the deployment of an alternative embodiment of an airbag assembly/system 400. In FIG. 4A, it can be seen that system 400 again comprises a main chamber/body 410, which comprises an opening 450 extending entirely therethrough. A head chamber 440 is shown inflated between body 410 and the head of occupant 10. As also seen in this figure, the head chamber 440 extends beyond the lateral boundaries of the opening 450. Thus, head chamber 440 is larger along this lateral dimension than the adjacent opening 450. Although not visible in the figures, it is contemplated that head chamber 440 may, but need not be, larger in other dimensions as well. As previously mentioned, in certain preferred embodiments, head chamber 440 may have a shape that is identical, substantially identical, or at least similar to that of opening 450 but larger along its entire perimeter.

FIG. 4B depicts assembly 400 during a subsequent stage of deployment. As shown in this figure, upon engagement with the head of occupant 10, head chamber 440 engages the walls/periphery of opening 450, which creates resistance due to friction between the head chamber 440 and the portion of the cushion 410 defining opening 450. In addition, in the depicted embodiment, the head chamber 440 partially wraps around the head of the occupant 10. This may provide additional benefits, such as providing lateral head support, which may negate the need for supplemental side lobes, as shown and discussed in connection with assembly 100. In addition, this may prevent or at least mitigate head injuries caused by twisting of the head due to, for example, high rotational velocities and/or accelerations of the brain.

Figure 5A:
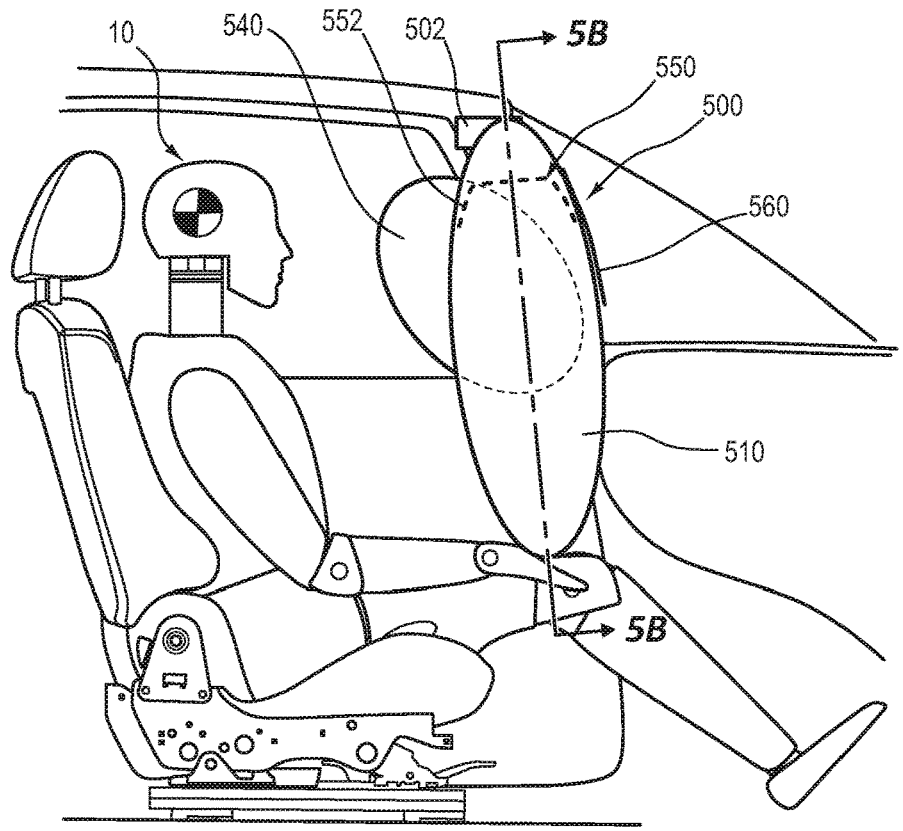
FIG. 5A is a side elevation view of a vehicle having an airbag system including a head chamber, an overlapping pass-through opening, and an external restraining member shown following deployment.

FIG. 5A depicts another example of an airbag assembly 500 shown during deployment adjacent to a vehicle occupant 10. Assembly 500 again comprises an inflator 502, a main body or chamber 510, and a head chamber 540 that is larger than an adjacent opening 550 so as to create an overlap/frictional engagement condition. As shown in this figure, head chamber 540 initially projects towards occupant 10 relative to the adjacent main body of cushion 510. Upon contacting the head of occupant 10, head chamber 540 may then articulate from the force of this engagement and at least partially enter opening 550. Again, in some embodiments, head chamber 540 may at least partially pass entirely through opening 550. Again, because the profile of head chamber 540 is less than that of opening 550, the portions of the cushion 510 and/or assembly 500 defining the opening 550 frictionally engage the head chamber 540 and provide increased restraint and energy absorption.

As previously mentioned, one or more portions of the opening 550 may be tapered if desired such that increased resistance is needed in order to initially enter, and subsequently exit, opening 550. These tapered regions 552 are shown at opposing ends of opening 550.

In addition, assembly 500 further comprises an external restraining member 560. Restraining member 560 may comprise, for example, a fabric panel or the like that may be coupled to the surface of the cushion 510 opposite from the side facing occupant 10 and provide a reaction surface for head chamber 540. Restraining member 560 may therefore be configured to engage the head chamber 540 during deployment to limit the amount of excursion of the head of the occupant 10 following contact with the head chamber 540. Although restraining member 560 is shown coupled to cushion 510 along only one side of opening 550 in the depicted embodiment, in other embodiments, multiple points of attachment may be used, such as at least one on each of two opposing sides of opening 550.

Figure 5B:
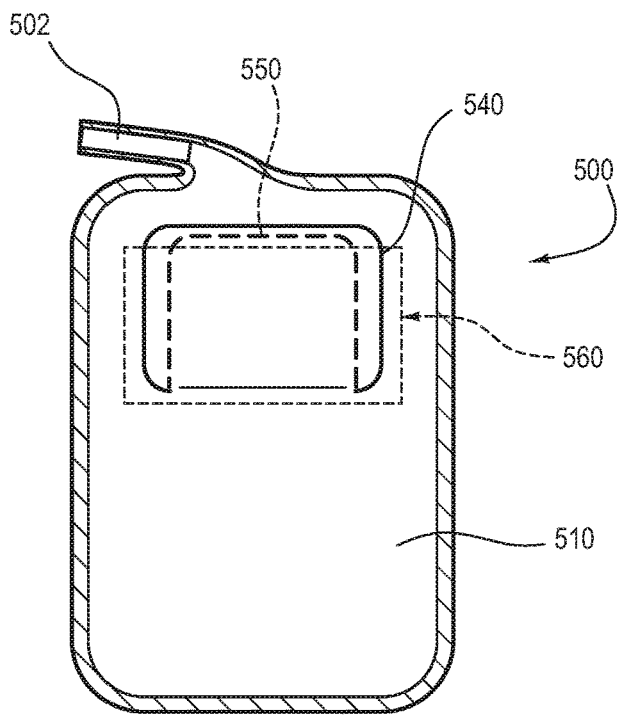
FIG. 5B is a cross-sectional view taken along line 5B-5B in FIG. 5A.

The cross-sectional image of FIG. 5B illustrates that both the head chamber 540 and the adjacent opening 550 may comprise one or more (three in the depicted embodiment) sides that are parallel, or at least substantially parallel. Preferably, each of these three sides of head chamber 540 is larger than the adjacent side of the opening 550, as also shown in FIG. 5B. However, it is contemplated that head chamber 540 may only be larger than opening 550 in one location and/or in one dimension, if desired. The panel/restraining member 560 may extend beyond the profile of the head chamber 540 and opening 550 in one or more dimensions, as also shown in FIG. 5B.

Figure 6A:
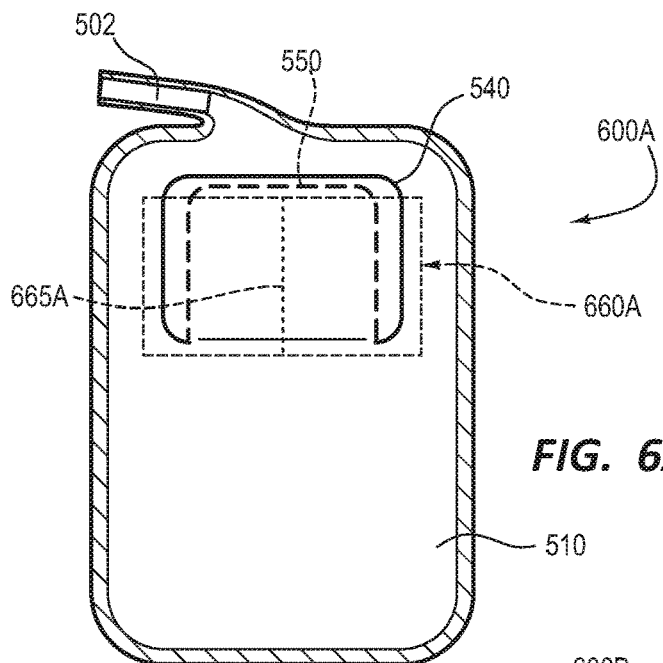
FIGS. 6A-6C are cross-sectional views of airbag cushions having alternative external restraining members.
Figure 6B:
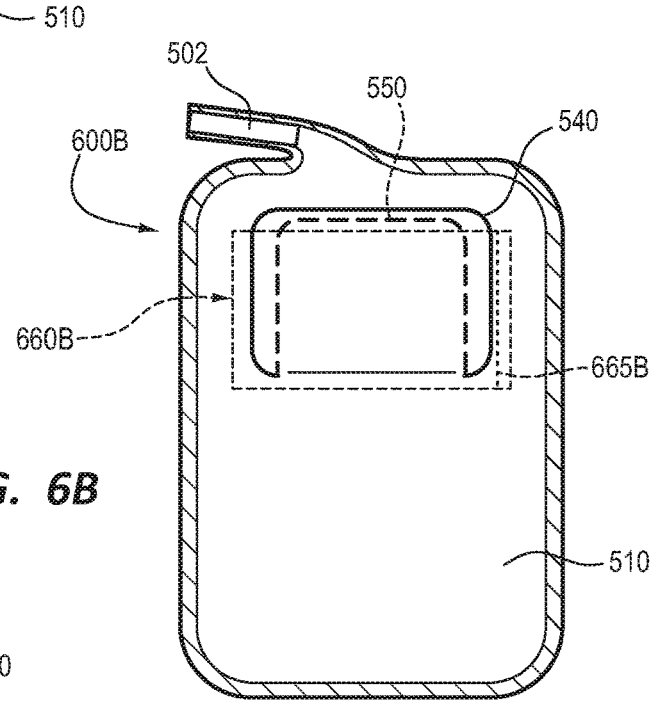
Figure 6C:
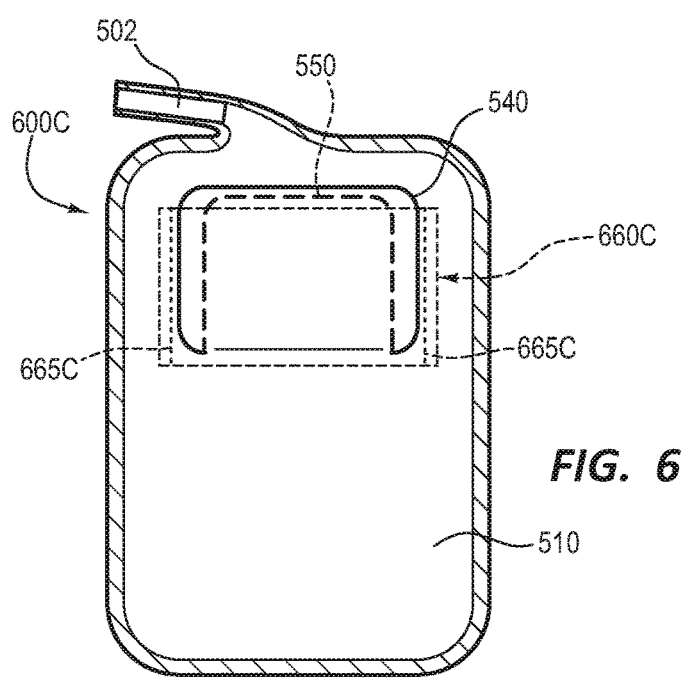

FIGS. 6A-6C illustrate various alternative configurations for the panel/restraining member in which the restraining member comprises one or more weakened portions, such as tear seams, perforated fabric, or the like, that are configured to sever during deployment to absorb energy during deployment and/or provide for additional head excursion.

In FIG. 6A, an assembly 600A is depicted in which a panel 660A is provided that includes a single weakened portion 665A positioned at a central location relative to the adjacent head chamber 540 and opening 550. In FIG. 6B, an assembly 600B is depicted in which a panel 660B is provided that includes a single weakened portion 665B positioned adjacent to a lateral side of the adjacent head chamber 540 and opening 550. Finally, in FIG. 6C, an assembly 600C is depicted in which a panel 660C is provided that includes two opposing weakened portions 665C positioned along opposing sides of the adjacent head chamber 540 and opening 550. It should be understood that, although the restraining members depicted in these figures comprise panels, in alternative embodiments, other types of restraining members, such as tethers or straps, may be used instead.

Figure 7A:
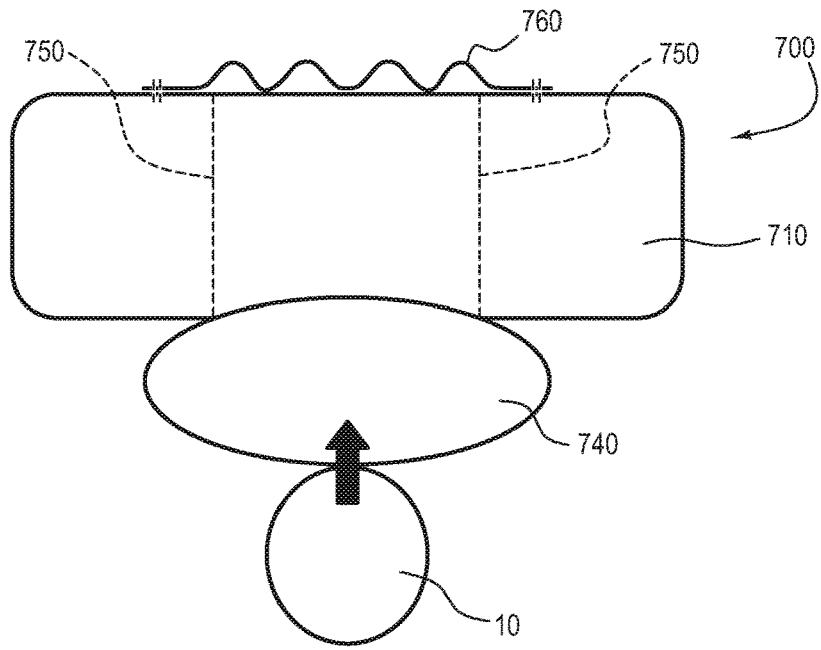
FIG. 7A is a top elevation view of another airbag system having a head chamber overlapping with a pass-through opening according to still other embodiments shown during an initial stage of deployment.
Figure 7B:
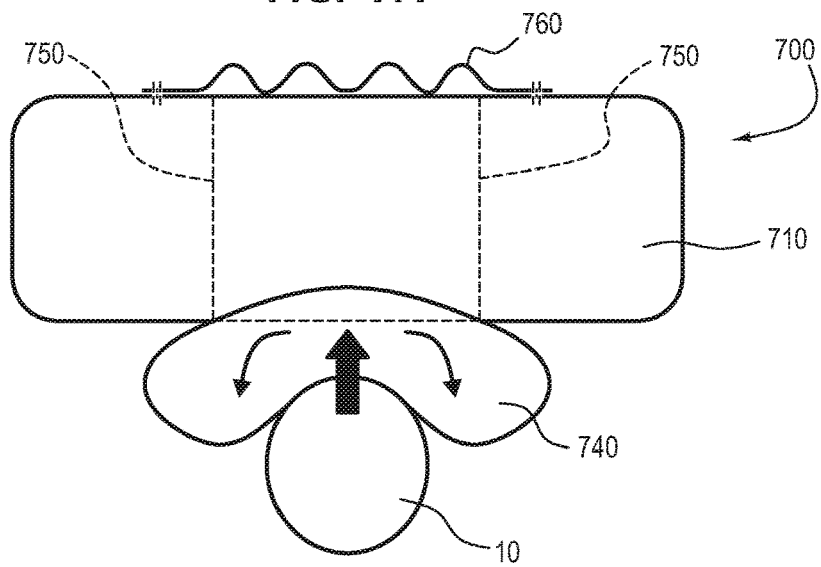
FIG. 7B is a top elevation view of the airbag system of FIG. 7A shown following engagement between an occupant's head and the head chamber of the system.
Figure 7C:
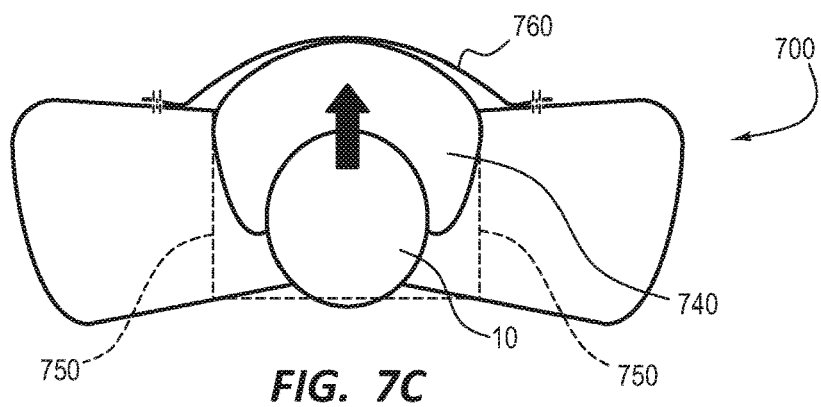
FIG. 7C is a top elevation view of the airbag system of FIGS. 7A and 7B following engagement between the head chamber and an external restraining member.

FIGS. 7A-7C depict yet another example of an airbag assembly 700 according to other embodiments. Assembly 700 again comprises a main chamber/body 710, which comprises an opening 750 extending entirely therethrough. A head chamber 740 is shown inflated between body 710 and the head of occupant 10. As also seen in this figure, the head chamber 740 extends beyond the lateral boundaries of the opening 750 and therefore head chamber 740 is larger along this lateral dimension than the adjacent opening 750. In addition, assembly 700 comprises a tether restraining member 760 that is coupled to the distal side of cushion 710 and along the profile of the adjacent opening 750.

FIG. 7B depicts assembly 700 during a subsequent stage of deployment. As shown in this figure, upon engagement with the head of occupant 10, head chamber 740 engages the walls/periphery of opening 750, which creates resistance due to friction between the head chamber 740 and the portion of the cushion 710 defining opening 750. In addition, in the depicted embodiment, the head chamber 740 partially wraps around the head of the occupant 10.

FIG. 7C depicts another subsequent stage of deployment. At this stage, the head of occupant 10 has entered opening 750 and head chamber 740 has partially passed entirely through opening 750 and engaged the tether 760. This may provide for further restraint and/or limiting the amount of expected excursion of the head of the occupant 10. Although not shown, tear seams or other weakened portions may be formed in tether 760 if desired.

Figure 8A:
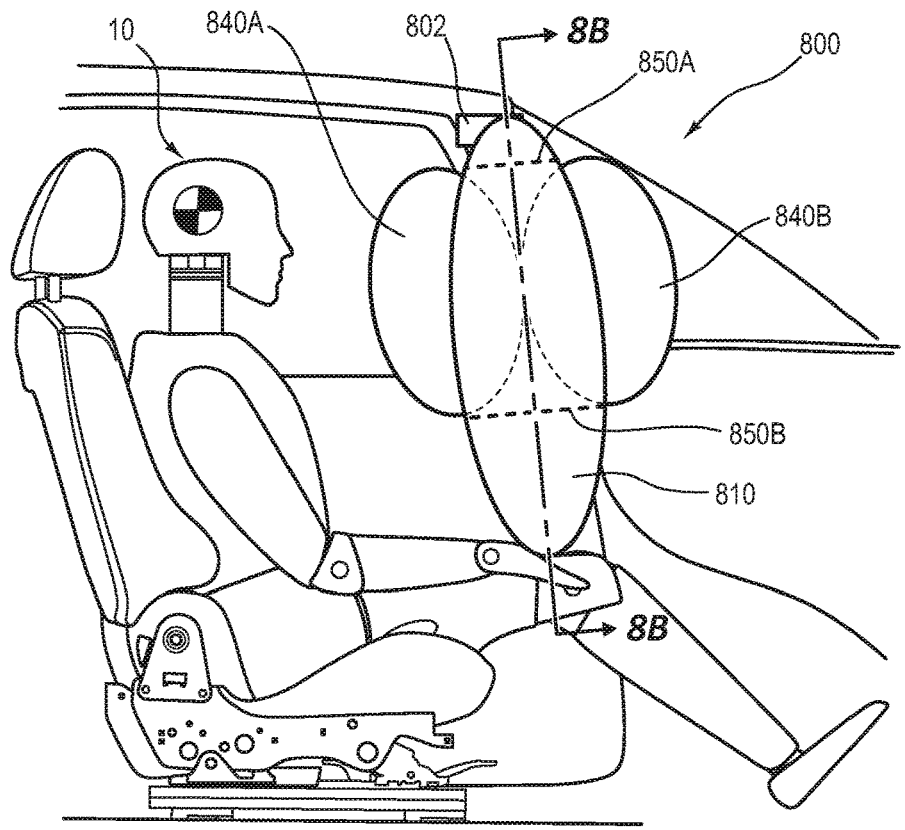
FIG. 8A is a side elevation view of a vehicle having an airbag system including two overlapping head chambers and an overlapping pass-through opening shown following deployment.
Figure 8B:
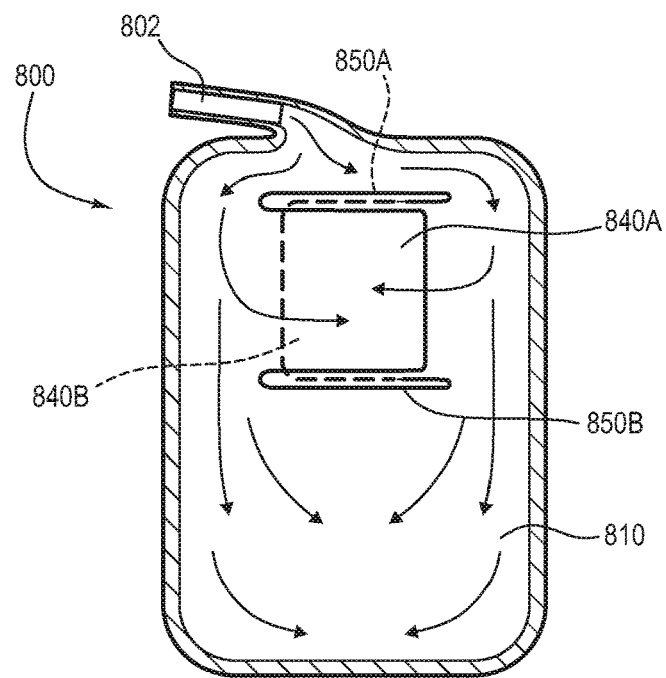
FIG. 8B is a cross-sectional view taken along line 8B-8B in FIG. 8A.

FIGS. 8A and 8B depict another embodiment of an assembly 800 in which the head chamber 840A deploys adjacent to a supplemental and/or overlapping chamber 840B. Otherwise, assembly 800 may be similar to those previously described, and may therefore comprise an inflator 802, a main body or chamber 810, and a head chamber 840A that is larger than an adjacent opening 850 so as to create an overlap/frictional engagement condition. As shown in FIG. 8A, head chamber 840A initially projects towards occupant 10 relative to the adjacent main body of cushion 810. Upon contacting the head of occupant 10, head chamber 840A may then articulate from the force of this engagement and at least partially enter opening 850.

However, unlike previous embodiments, opening 850 is defined, at least in part, by two opposing, parallel slots 850A/850B, as best seen in the cross-sectional view of FIG. 8B. These slots 850A/850B, define at opposing ends, respective fixed ends of both the head chamber 840A and an adjacent supplemental/overlapping chamber 840B. These fixed ends extend perpendicular (or substantially perpendicular in other embodiments) from and between slots 850A and 850B along opposite ends of the respective slots. In other words, a fixed end of head chamber 840A extends between the left sides of slots 850A and 850B and a fixed end of supplemental/overlapping chamber 840B extends between the right sides of slots 850A and 850B. The opposite ends of both chambers 840A/840B are free ends configured to allow for articulation, similar to the head chambers previously discussed.

As illustrated by this configuration, pass-through openings may be configured in a variety of different ways, including a single slot, multiple slots, or, in still other contemplated embodiments, a complete, contiguous hole or other suitable opening. In addition, by providing gas entry paths in opposing directions from the sides of the respective articulating chambers 840A/840B, as indicated by the arrows in FIG. 8B, rather than the bottom as with previously-discussed embodiments, earlier head restraint from these overlapping chambers may be provided.

The overlapping, supplemental chamber 840B is configured to deploy adjacent to the head chamber 840A. In the depicted embodiment, chamber 840B is configured to deploy distal of the head chamber 840A relative to the occupant and on the opposite side of the opening defined by slots 850A and 850B of assembly 800. Head chamber 840A is also configured to engage and articulate the overlapping chamber 840B within this opening during deployment.

Figure 9A:
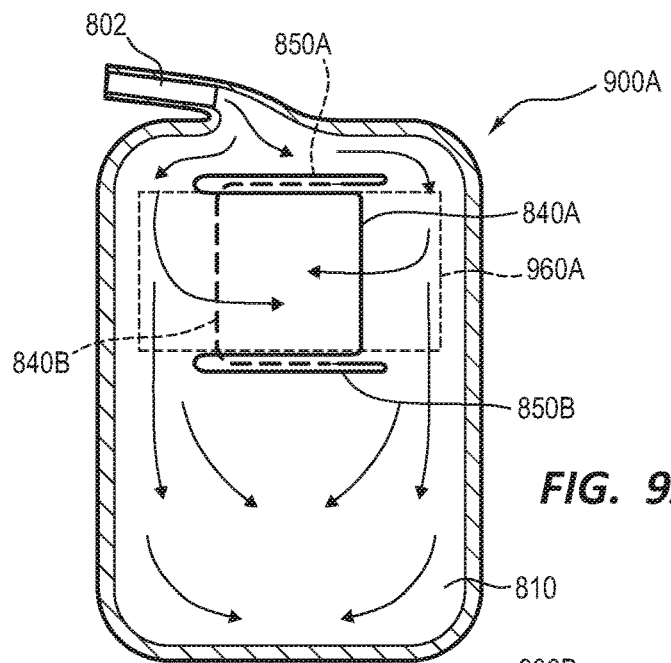
FIGS. 9A-9C are cross-sectional views of airbag cushions having overlapping head chambers along with three different examples of external restraining members.
Figure 9B:
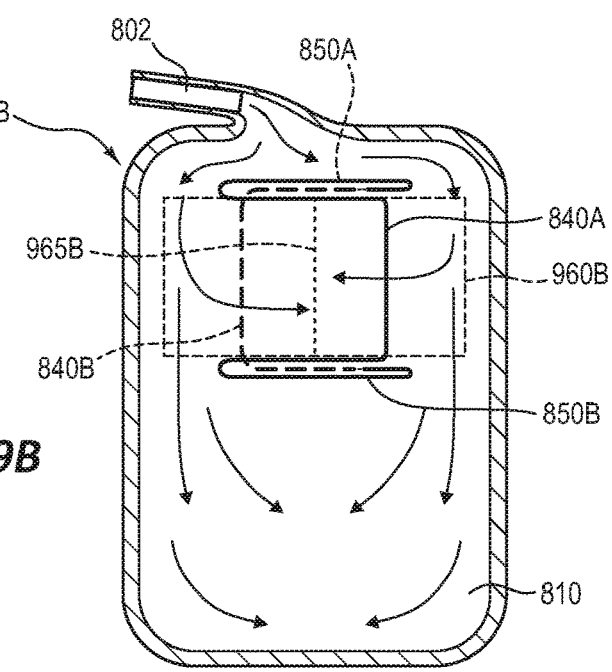
Figure 9C:
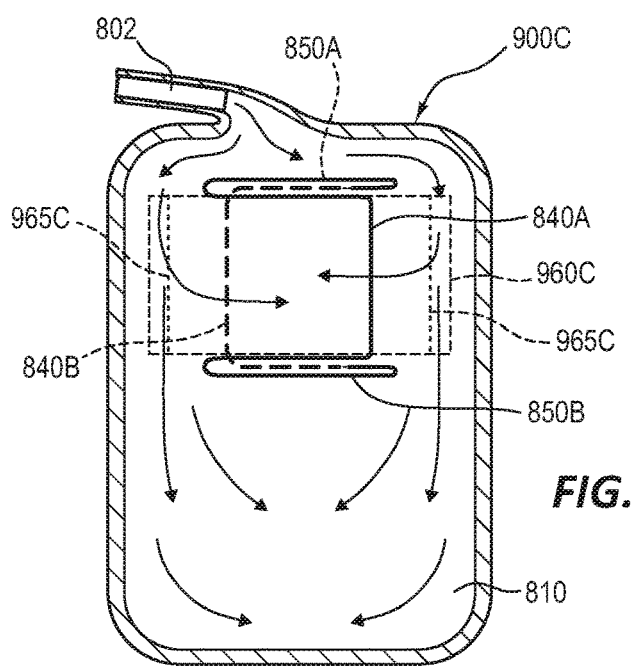

Some embodiments may further comprise an external restraining member. Thus, FIGS. 9A-9C depict various alternative embodiments in which a restraining member 960 is coupled to the surface of the cushion 810 opposite from the side facing occupant 10 to provide a reaction surface for head chamber 840A. In FIG. 9A, an assembly 900A is depicted in which a panel 960A is provided to engage the overlapping/supplemental chamber 840B. FIG. 9B depicts another assembly 900B comprising a panel 960B that includes a single weakened portion 965B positioned at a central location relative to the adjacent overlapping/supplemental chamber 840B and opening 850. Finally, FIG. 9C depicts still another assembly 900C in which a panel 960C is provided that includes two opposing weakened portions 965C positioned along opposing sides of the adjacent overlapping/supplemental chamber 840B and opening 850. It should be understood that, although the restraining members depicted in these figures comprise panels, as previously mentioned, in alternative embodiments, other types of restraining members, such as tethers or straps, may be used instead.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An overhead airbag assembly, comprising:
an airbag cushion configured to deploy from a vehicle roof structure;
a head contact chamber configured to engage a head of an occupant of the vehicle upon deployment; and
an opening formed within the airbag cushion adjacent to the head contact chamber and extending from a first surface of the airbag cushion configured to engage the occupant to a second surface of the airbag cushion opposite the first surface, wherein the opening is smaller along at least one dimension than the head contact chamber upon deployment such that the head contact chamber cannot enter the opening without engaging one or more portions of the airbag cushion defining the opening, and wherein the head contact chamber is configured to deploy at least partially outside of the opening towards the occupant and be forced into the opening and frictionally engaged with the one or more portions of the airbag cushion defining the opening via contact with the occupant's head during deployment.

2. The overhead airbag assembly of claim 1, wherein the opening is defined by at least one slot extending through the airbag cushion.

3. The overhead airbag assembly of claim 2, wherein the opening is defined by a first slot and a second slot, wherein the first slot is spaced apart from the second slot.

4. The overhead airbag assembly of claim 3, further comprising an overlapping chamber configured to deploy distal of the head contact chamber relative to the occupant, wherein the first slot is at least substantially parallel to the second slot, and wherein the head contact chamber is configured to engage and articulate the overlapping chamber within the opening during deployment.

5. The overhead airbag assembly of claim 2, wherein the at least one slot defines a fixed end of the head contact chamber from which the head contact chamber extends from a primary chamber of the airbag cushion.

6. The overhead airbag assembly of claim 1, further comprising a restraining member coupled to the second surface of the airbag cushion, wherein the restraining member is configured to engage the head contact chamber during deployment to limit the amount of excursion of the head of the occupant following contact with the head contact chamber.

7. The overhead airbag assembly of claim 6, wherein the restraining member comprises at least one of a tether and a panel.

8. The overhead airbag assembly of claim 6, wherein the restraining member comprises at least one weakened portion configured to sever during deployment.

9. An airbag cushion, comprising:
a primary chamber comprising a slot extending from a first surface of the airbag cushion, the first surface configured to engage a vehicle occupant, to a second surface of the airbag cushion opposite from the first surface; and
a secondary chamber configured to deploy adjacent to the first surface between the vehicle occupant and the primary chamber with at least a portion of the secondary chamber protruding towards the vehicle occupant relative to the primary chamber, wherein the secondary chamber is configured to frictionally engage at least a portion of the airbag cushion defining the slot during deployment.

10. The airbag cushion of claim 9, wherein the airbag cushion comprises an overhead airbag cushion.

11. The airbag cushion of claim 10, wherein the airbag cushion is configured to deploy from a vehicle roof structure.

12. The airbag cushion of claim 9, wherein the secondary chamber comprises a head contact chamber configured to frictionally engage the at least a portion of the airbag cushion after engaging a head of the vehicle occupant.

13. The airbag cushion of claim 12, further comprising a pair of side lobes configured to deploy from opposite sides of the head contact chamber.

14. The airbag cushion of claim 12, further comprising an external restraining member comprising at least one of a panel and a tether coupled to the second surface, wherein the external restraining member is configured to limit the excursion of the head of the vehicle occupant during deployment.

15. The airbag cushion of claim 14, wherein the external restraining member is configured to directly engage the head contact chamber during deployment.

16. An overhead airbag assembly, comprising:
   an airbag cushion, comprising:
     a primary chamber comprising an opening extending therethrough, wherein the opening is positioned at an at least substantially central position between opposing lateral sides of the primary chamber upon deployment; and
     a head chamber configured to deploy proximal of the primary chamber relative to a vehicle occupant adjacent to the opening and at least partially outside of the opening, wherein the head chamber is configured to engage a head of the vehicle occupant during deployment, wherein the head chamber is configured to at least partially pass through the opening during deployment after contacting the head of the vehicle occupant, and wherein the head chamber is configured to frictionally engage at least a portion of the airbag cushion defining the opening while at least partially passing through the opening.

17. The overhead airbag assembly of claim 16, wherein the opening comprises a shape at least substantially identical to but smaller than a shape of the head chamber.

18. The overhead airbag assembly of claim 16, wherein the airbag cushion further comprises a secondary head chamber positioned distal of the head chamber relative to the vehicle occupant during deployment, wherein the secondary head chamber overlaps with and is configured to engage the head chamber during deployment.

19. The overhead airbag assembly of claim 18, wherein the head chamber extends from the primary chamber at a fixed end, wherein the secondary head chamber extends from the primary chamber at a fixed end, and wherein the fixed end of the head chamber is positioned opposite from the fixed end of the secondary head chamber relative to the opening.

20. The overhead airbag assembly of claim 19, wherein the airbag cushion further comprises a head chamber panel coupled to a distal side of the airbag cushion, wherein the head chamber panel is configured to engage the head chamber during deployment to at least one of (1) limit the amount of articulation of the head chamber; and (2) absorb energy from the head chamber.

* * * * *